US012168952B1

(12) United States Patent
Kim

(10) Patent No.: US 12,168,952 B1
(45) Date of Patent: Dec. 17, 2024

(54) PRECHAMBER IGNITED ENGINE AND OPERATING METHODS THEREFOR

(71) Applicant: Caterpillar Inc., Peoria, IL (US)

(72) Inventor: Charlie Chang-Won Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/234,418

(22) Filed: Aug. 16, 2023

(51) Int. Cl.
*F02B 19/10* (2006.01)
*F02B 9/06* (2006.01)
*F02B 47/08* (2006.01)
*F02B 51/02* (2006.01)

(52) U.S. Cl.
CPC ............ *F02B 19/1085* (2013.01); *F02B 9/06* (2013.01); *F02B 47/08* (2013.01); *F02B 51/02* (2013.01); *F02B 2201/02* (2013.01)

(58) Field of Classification Search
CPC .... F02B 9/04; F02B 9/06; F02B 19/10; F02B 19/1085; F02B 47/08; F02B 51/02; F02D 13/0234; F02D 13/0269; F02D 41/009; F02D 41/401-403; F02D 41/405; F02D 35/023; F02D 35/028; F02D 2200/021; F02D 2041/389; Y02T 10/12; Y02T 10/40; F02M 51/00
See application file for complete search history.

(56) References Cited

U.S. PATENT DOCUMENTS 4,603,662 A 8/1986 Norton et al.
5,097,803 A 3/1992 Galvin
5,603,298 A 2/1997 Kawamura
6,276,334 B1 8/2001 Flynn et al.
7,793,637 B2 9/2010 Strom et al.
8,469,009 B2 6/2013 Munshi et al.
10,605,222 B2 3/2020 Idicheria et al.
10,669,958 B2 6/2020 Denso
10,815,441 B2 10/2020 Morris et al.
11,125,180 B2 9/2021 Hampson et al.
11,333,061 B1 * 5/2022 Zhang ..................... F02B 21/00
2005/0145220 A1 7/2005 Damitz
2017/0122184 A1 * 5/2017 Hampson .............. F02D 41/402
(Continued)

FOREIGN PATENT DOCUMENTS

CA 1289430 C 9/1991
JP 2006250047 A 9/2006

OTHER PUBLICATIONS

U.S. Appl. No. 18/107,545 to Kim, filed Feb. 9, 2023.
U.S. Appl. No. 16/891,170, filed Feb. 9, 2023, to Kim.
U.S. Appl. No. 18/107,545 Office Action dated Jun. 14, 2023.

*Primary Examiner* — Hai H Huynh
*Assistant Examiner* — Johnny H Hoang
(74) *Attorney, Agent, or Firm* — Brannon Sowers & Cracraft PC

(57) ABSTRACT

Operating an engine includes moving a piston in an engine from a bottom-dead-center position toward a top-dead-center position in a cylinder, and directly admitting a prechamber fuel such as methanol into a prechamber ignition device fluidly connected to the cylinder. Operating the engine further includes autoigniting the prechamber fuel to produce jets of gases from the prechamber ignition device containing reactive species such as hydroxyl radicals to ignite a main charge of a fuel in the cylinder via the jets of gases produced via the autoignition of the prechamber fuel. Related apparatus is also disclosed.

17 Claims, 2 Drawing Sheets

(56) References Cited

U.S. PATENT DOCUMENTS

| | | | | |
|---|---|---|---|---|
| 2022/0090552 | A1* | 3/2022 | Yoneya | F02D 41/062 |
| 2022/0251998 | A1* | 8/2022 | Seba | F02M 21/0248 |
| 2022/0275748 | A1* | 9/2022 | Shirley | F02M 61/14 |
| 2022/0372928 | A1* | 11/2022 | Andou | F02D 19/024 |
| 2023/0034824 | A1* | 2/2023 | Zhang | F02B 19/108 |

* cited by examiner

PRECHAMBER IGNITED ENGINE AND OPERATING METHODS THEREFOR

TECHNICAL FIELD

The present disclosure relates generally to operating an engine, and more particularly to igniting a main charge of a fuel in a cylinder via reactive species produced in a prechamber.

BACKGROUND

Internal combustion engines are well-known and employed globally for many different purposes ranging from providing torque for propelling machines to electrical power generation. In a typical example, a fuel is combusted with air in a combustion cylinder in an engine to drive a piston coupled to a crankshaft that rotates parts in a machine system. Spark-ignited engines are typically operated on gasoline or other liquid fuels, including sometimes alcohol fuels or various blends, as well as gaseous fuels such as natural gas. Compression-ignition engines typically utilize diesel, biodiesel, or various blends and pressurize a cylinder in an engine to autoignite fuel and air rather than utilizing an electrical spark.

Engineering resources have been broadly applied in recent years to different engine technologies believed to produce reduced levels of certain emissions, including oxides of nitrogen or $NO_X$, particulate matter, and so-called greenhouse gases. Improvements in emissions are often associated with tradeoffs in other performance factors such as power, power density, or fuel efficiency. In connection with these efforts, engineers have sought to develop engines and operating strategies that utilize certain alternative fuels or improve upon known strategies using alternative fuels. Methanol, for example, has shown promise respecting engine operation with reduced emissions. Where attempts have been made to utilize methanol in reciprocating internal combustion engines it has been observed that the fuel can be challenging to reliably and robustly ignite, particularly in compression-ignition strategies. One known engine operating strategy proposing methanol as a fuel is known from co-pending and commonly owned U.S. patent application Ser. No. 18/107,545 to Kim, filed Feb. 9, 2023.

SUMMARY

In one aspect, a method of operating an engine includes directly admitting a prechamber fuel into a prechamber of a prechamber ignition device fluidly connected to a cylinder in an engine. The method further includes urging air pressurized in the cylinder into the prechamber via moving a piston toward a top-dead-center position in the cylinder, and producing jets of gases advanced from the prechamber ignition device into the cylinder. The method further includes igniting a main charge of a fuel in a cylinder via reactive species produced in the prechamber and conveyed into the cylinder in the jets of gases.

In another aspect, a method of operating an engine includes moving a piston coupled to a crankshaft in an engine from a bottom-dead-center position toward a top-dead-center position in a cylinder in the engine, and directly injecting a prechamber fuel containing methanol into a prechamber ignition device fluidly connected to the cylinder. The method further includes autoigniting the prechamber fuel to produce jets of gases from the prechamber ignition device, and igniting a main charge of a fuel in the cylinder via jets of gases produced via the autoignition of the prechamber fuel.

In still another aspect, an engine system includes an engine having a cylinder formed therein, an intake port, an exhaust port, and a piston movable in the cylinder between a bottom-dead-center position and a top-dead-center position to increase a temperature and a pressure in the cylinder. The engine system further includes a fuel system having a fuel supply of a liquid fuel containing methanol, and an ignition system including a prechamber ignition device having a prechamber, a fuel port fluidly connected to the prechamber, an exhaust feed opening fluidly connected to the prechamber, and at least one ignition port fluidly connected to the cylinder. The ignition system further includes a fuel admission valve positioned fluidly between the fuel port and the fuel supply, and an exhaust admission valve position fluidly between the exhaust feed opening and the exhaust port.

DETAILED DESCRIPTION

Figure 1:
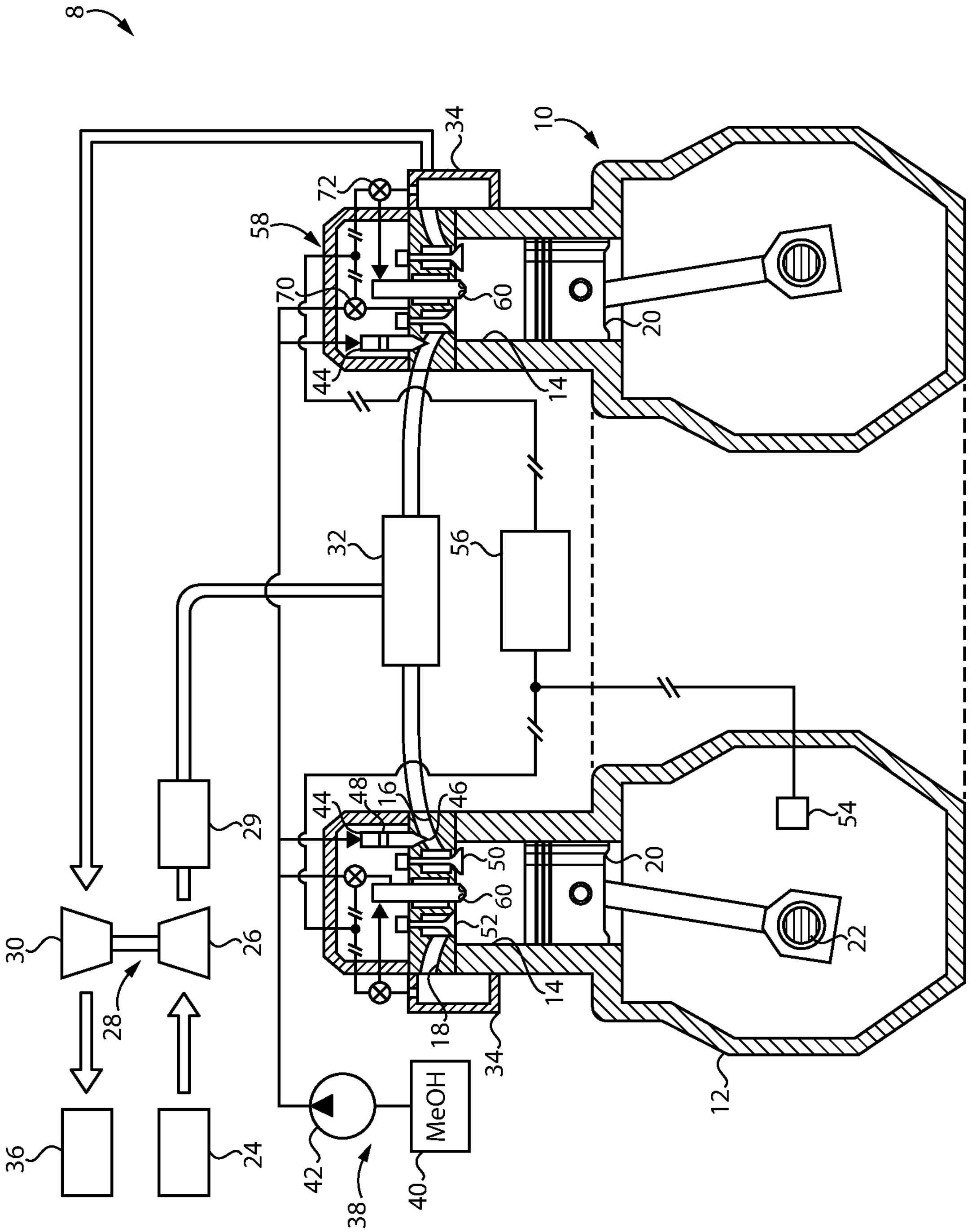
FIG. 1 is a diagrammatic view of an engine system, according to one embodiment.

Referring to FIG. 1, there is shown an internal combustion engine system 8, according to one embodiment. Engine system 8 includes an engine 10 having an engine housing 12 with a plurality of cylinders 14 formed therein. Engine housing 12 further includes an intake port 16, an exhaust port 18, and a plurality of pistons 20 each movable within a respective cylinder 14 between a bottom-dead-center position and a top-dead-center position to increase a temperature and a pressure in the respective cylinder 14. Engine 10 might include any number of combustion cylinders in any suitable arrangement, including an inline pattern, a V-pattern, or still another. A single cylinder engine configuration is within the scope of the present disclosure. Accordingly, description or discussion herein of a cylinder 14, a piston 20, or other components of engine system 8 in the singular will be understood to refer by way of analogy to any other of such similar or identical components as may be used in engine system 8. Pistons 20 are coupled to a crankshaft 22 rotatable to power a load such as an electrical generator, a pump, a compressor, or a driveline in a vehicle to name a few examples.

Engine system 8 also includes an air inlet 24 structured to admit intake air for combustion which is conveyed by way of a compressor 26 in a turbocharger 28 to an intake manifold 32. Compressed intake air from compressor 26 may be cooled in an aftercooler 29. Intake air is conveyed from intake manifold 32 to respective intake ports 16 in a generally conventional manner. Each cylinder 14 may be equipped with one or more intake valves 50 and one or more exhaust valves 52 generally conventionally operated, respectively, to control fluid communication between cylinder 14 and intake port 16, and between cylinder 14 and exhaust port 18. Exhaust port 18 is fluidly connected to an exhaust manifold 34. Exhaust from engine 10 is conveyed from exhaust manifold 34 to a turbine 30 of turbocharger 28 and thenceforth to an exhaust outlet 36. As an alternative or in addition to turbocharger 28, a supercharger or multiple turbocharger stages might be used. Aftertreatment equipment might be coupled to exhaust outlet 36 in some embodiments, and omitted altogether in others. As will be further apparent from the following description, engine system 8 is uniquely configured for improved operation on certain fuels to produce low or near-zero levels of certain emissions.

Engine system 8 further includes a fuel system 38. Fuel system 38 includes a fuel supply 40 of a liquid fuel containing methanol in some embodiments. A liquid fuel containing methanol includes a fuel that is substantially only methanol, as well as blends of methanol and other fuels, with methanol typically, although not necessarily, predominating. Fuel system 38 also includes a fuel injector 44. In the illustrated embodiment fuel injector 44 includes one or more spray outlets 46 positioned within intake port 16. In other embodiments, spray outlets of a fuel injector might be positioned directly within cylinder 14. Fuel injector 44 is thus arranged for direct injection or port injection of the liquid fuel of fuel supply 40. Fuel system 38 may include one or more pumps 42 to pressurize the liquid fuel to an injection pressure and convey the same to one or more fuel injectors 44. Fuel injector 44 includes an electrically actuated fuel injection valve 48 positioned fluidly between fuel supply 40 and spray outlet 46.

An electronic control unit or ECU 56 is in control communication with fuel injector 44 to control a timing, amount, injection number, and potentially other characteristics of fuel injection. ECU 56, including any suitable computerized control unit, is also in communication with an engine timing sensor 54 suitably coupled to crankshaft 22 or any component having a known angular relationship with crankshaft 22 so as to produce an engine timing signal that is acted upon by ECU 56 to control fuel injection, as further discussed herein. Fuel injected by way of fuel injector 44 can produce a main charge of fuel that is mixed with air and ignited within cylinder 14 by way of prechamber ignition, as further discussed herein. As described, the main fuel charge may include the same fuel that is stored in fuel supply 40. In other instances, different fuels could be used for a main fuel charge and as a prechamber fuel, including for example a main fuel charge that includes a methanol fuel, and a prechamber fuel charge that includes methanol or potentially a diesel fuel such as a diesel distillate fuel. In some embodiments, a prechamber fuel charge of methanol could be used to ignite a main fuel charge containing diesel, potentially enabling the main charge containing diesel to be ignited at a relatively lower compression ratio than is conventionally required, for instance a compression ratio less than approximately 15:1 and potentially less than approximately 12:1. Using a main fuel charge comprised of multiple, separate fuels is also within the scope of the present disclosure.

Figure 2:
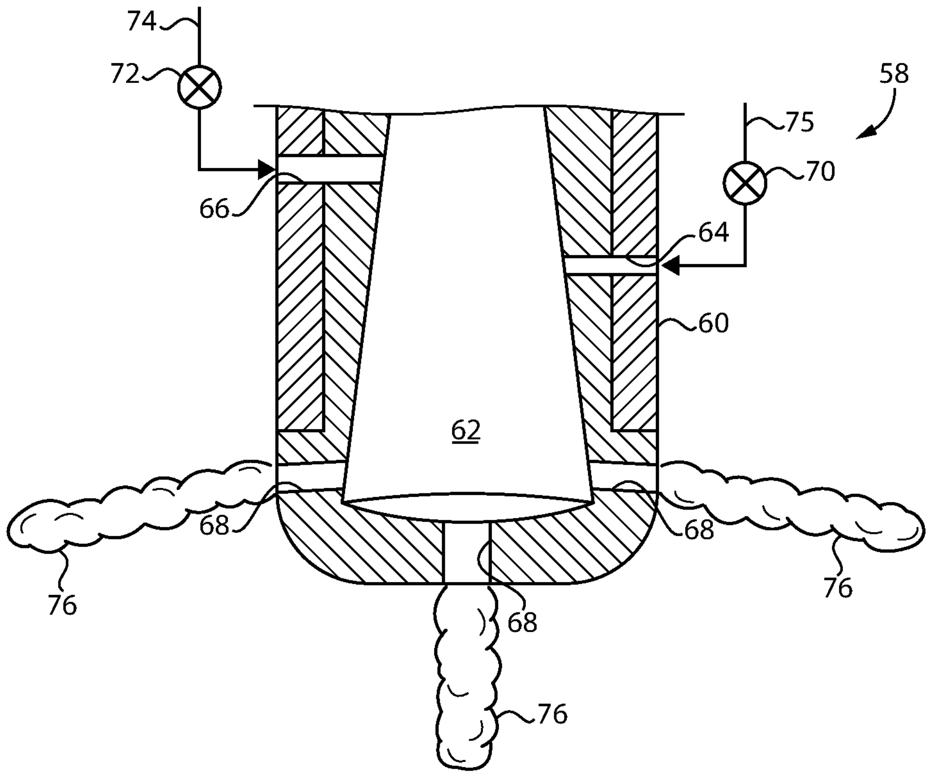
FIG. 2 is a diagrammatic view of a prechamber ignition device, according to one embodiment.

Referring also now to FIG. 2, engine system 10 also includes an ignition system 58 having a prechamber ignition device 60. A plurality of prechamber ignition devices may be provided and each associated with one cylinder 14 in engine 10. Prechamber ignition device 60 may be supported in engine housing 12 and extend into cylinder 14, and includes a prechamber 62 formed by a prechamber housing (not numbered), a fuel port 64 fluidly connected to prechamber 62, an exhaust feed opening 66 fluidly connected to prechamber 62, and at least one ignition port 68 fluidly connected to cylinder 14. Ignition system 58 may further include a fuel admission valve 70, controllably coupled to ECU 56 and electrically actuated, positioned fluidly between fuel port 64 and fuel supply 40. A fuel pressure of fuel supplied to prechamber 62 might be relatively higher, or in some instances potentially lower, than a pressure of fuel supplied to cylinder 14 depending upon the application. Ignition system 58 may also include an exhaust admission valve 72, controllably coupled to ECU 56 and electrically actuated, and positioned fluidly between exhaust feed opening 66 and exhaust port 18. A fuel conduit 75 extends between pump 42 and fuel admission valve 70. An exhaust conduit 74 extends between exhaust port 18 and exhaust admission valve 72.

Exhaust conduit 74 may include an uncooled exhaust conduit. An uncooled exhaust conduit means the conduit is not actively cooled by way of pumped heat exchange fluids, coolers, fans, or dedicated heat exchange structures such as passive heat exchange fins. Accordingly, raw exhaust admitted into prechamber 62 can have an exhaust temperature as high as, or nearly as high as, exhaust passing through exhaust port 18. In some instances, the provision of hot exhaust directly admitted into prechamber 62 can assist in promoting desirable chemical reactions relative to formation of reactive species in an autoignited prechamber fuel charge used to ignite the main charge of fuel in cylinder 14, as further discussed herein.

As alluded to, the present disclosure contemplates exploiting reaction pathways associated with production of reactive species derived from a prechamber fuel in a prechamber that are advanced out of the prechamber to cause or hasten ignition of a main charge in a cylinder. Whereas traditional prechamber ignition strategies typically produce hot jets of combustion gases that rapidly increase temperature and pressure locally in a cylinder to trigger ignition, according to the present disclosure hot jets of gases containing reactive species such as hydroxyl (OH) radicals from dissociation of hydrogen peroxide in the prechamber act to chemically ignite a main charge along with high temperatures of the gases in the hot jets. A full description of the reaction pathways promoted and exploited, including a medium temperature combustion reaction pathway, can be found in commonly owned and co-pending application Ser. No. 18/107,545 referenced above.

Operating engine system 8 and engine 10 can include directly admitting a prechamber fuel into prechamber 62 of prechamber ignition device 60, and urging air pressurized in cylinder 14 into prechamber 62 via moving piston 20 toward the top-dead-center position in cylinder 14. Autoignition of the directly admitted prechamber fuel can produce jets of gases shown via numeral 76, and containing reactive species. The jets of gases are advanced from device 60 into cylinder 14 to ignite a main charge of fuel in cylinder 14 via the reactive species produced in prechamber 62. As discussed above, the prechamber fuel may include methanol, and the main fuel may also include methanol. The main fuel might in some embodiments include a traditional compression-ignition fuel such as diesel, or various blends of alcohol and/or hydrocarbon fuels. The reactive species may include hydroxyl radicals produced by decomposition of hydrogen peroxide derived from the prechamber fuel according to a medium temperature combustion pathway as noted above.

It will be recalled that raw exhaust substantially at an engine-out exhaust temperature may be directly admitted into prechamber 62. During operating engine system 8 incoming intake air will have a tendency to cool cylinder 14. Prechamber ignition device 60, including prechamber 62 itself, may be cooled relatively less by the incoming intake air than cylinder 14. It is desirable for a temperature in prechamber 62 to be relatively higher than a typical in-cylinder temperature so as to promote formation of hydrogen peroxide and ultimately hydroxyl radicals by decomposition of the hydrogen peroxide. Accordingly, raw exhaust directly admitted into prechamber 62 can assist in maintaining prechamber 62 at a higher temperature than what might otherwise be observed, effectively enlarging a window where prechamber temperatures are favorable for medium temperature combustion, approximately 750K or greater. Moreover, in at least some instances raw exhaust can contain nitric oxide (NO) which can react with hydroperoxyl formed from prechamber fuel undergoing medium temperature combustion reaction to produce reactive species including additional OH radicals that will ultimately provide a more robust ignition of the main charge because of higher total amounts of OH radicals produced. The production of the additional OH radicals may occur according to the reaction pathway $NO+HO_2 \rightarrow NO_2+OH$.

A temperature in prechamber 62 may be increased to a hydrogen peroxide decomposition temperature that is greater than an in-cylinder temperature, to produce the reactive species. In an embodiment, the hydrogen peroxide decomposition temperature may be greater than 900 Kelvin. Another way to understand these general principles is that a temperature in prechamber 62 may be maintained or increased relative to a temperature in cylinder 14 via directly admitted exhaust gases, and the temperature increased to the hydrogen peroxide decomposition temperature. A temperature in prechamber 62 upon admitting the prechamber fuel may be at least 700 Kelvin in at least some instances. As a result, the medium temperature combustion pathway is favored, relatively increasing $H_2O_2$ production over what would otherwise be observed. During a compression stroke, typically at or near top-dead-center $H_2O_2$ formed via medium temperature combustion will dissociate to OH radicals resulting in more robust ignition of the prechamber fuel that is injected at or near top-dead-center due to the increased $H_2O_2$ production from medium temperature combustion.

INDUSTRIAL APPLICABILITY

Figure 3:
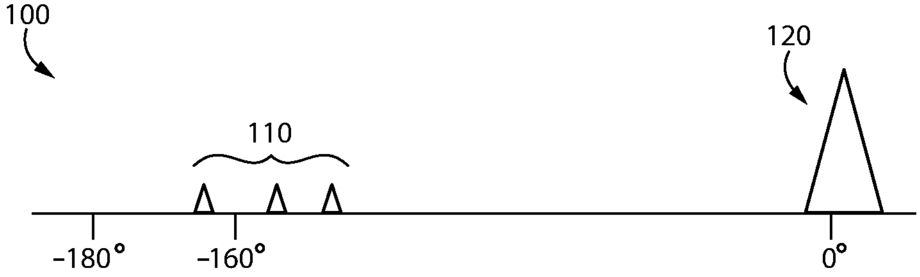
FIG. 3 is a chart of prechamber fuel admission to a prechamber ignition device and main fuel admission to a cylinder, according to one embodiment.

Referring also now to FIG. 3, there is shown a chart 100 illustrating conceptually events in an engine cycle according to the present disclosure. The location of 0° in chart 100 corresponds to a crank angle of engine 10 with piston 20 at the top-dead-center position. At approximately −180°, piston 20 is at the bottom-dead-center position. At approximately −180° exhaust valve 52 and intake valve 50 are both closed and piston 20 commences a compression stroke. From about −180° to about −160° a timing window for admission of the prechamber fuel into prechamber 62 opens. Exhaust can be admitted to prechamber 62 prior to −180° degrees, such as during an exhaust stroke of piston 20. Engine system 8 may be operated in a four-stroke engine cycle. As depicted in FIG. 3 and as shown at numeral 110, multiple shots of prechamber fuel are directly injected into prechamber 62. At least one of the shots of prechamber fuel may occur between −180° and −160°. Also in the illustrated embodiment a total of three shots of prechamber fuel are injected, although the present disclosure is not thereby limited. A quantity of each of the shots of prechamber fuel 110 may be equal, although the present disclosure is also not limited in this regard. Beginning just prior to 0° and ending shortly after 0°, a main shot of the main fuel is injected as shown at numeral 120. Between the injection of the multiple shots of prechamber fuel of 110 and injection of the main shot 120 the prechamber fuel can autoignite in prechamber 62 and combust according to the medium temperature combustion pathway as described in above-referenced application Ser. No. 18/107,545 to produce hydroxyl radicals by way of decomposition of hydrogen peroxide. The jets 76 advanced from prechamber 62 into cylinder 14 containing the reactive species and high temperature gases ignite the main charge of fuel in cylinder 14.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine comprising:

directly admitting a prechamber fuel into a prechamber of a prechamber ignition device fluidly connected to a cylinder in an engine;

urging air pressurized in the cylinder into the prechamber via moving a piston toward a top-dead-center position in the cylinder;

directly admitting exhaust into the prechamber via an exhaust feed opening fluidly connecting an uncooled exhaust conduit to the prechamber;

autoigniting the prechamber fuel in the prechamber;

producing jets of gases advanced from the prechamber ignition device through at least one ignition port of the prechamber ignition device into the cylinder; and igniting a main charge of a fuel in the cylinder via reactive species produced in the prechamber and conveyed into the cylinder in the jets of gases.

2. The method of claim 1 wherein the prechamber fuel includes a liquid prechamber fuel, and the main charge of a fuel includes a liquid main fuel that is port injected or direct injected into the cylinder.

3. The method of claim 1 wherein the directly admitting a prechamber fuel includes directly injecting multiple shots of the prechamber fuel into the prechamber.

4. The method of claim 1 wherein the reactive species include hydroxyl radicals produced by decomposition of hydrogen peroxide derived from the prechamber fuel.

5. The method of claim 4 wherein the prechamber fuel includes methanol.

6. The method of claim 4 wherein a temperature in the prechamber is increased to a hydrogen peroxide decomposition temperature greater than an in-cylinder temperature to produce the reactive species.

7. The method of claim 1 wherein the temperature in the prechamber is maintained or increased via the exhaust, and further comprising producing additional reactive species via reaction of nitric oxide in the exhaust.

8. The method of claim 7 wherein the hydrogen peroxide decomposition temperature is greater than 900K.

9. A method of operating an engine comprising:

moving a piston coupled to a crankshaft in an engine from a bottom-dead-center position toward a top-dead-center position in a cylinder in the engine;

directly admitting a prechamber fuel containing methanol into a prechamber ignition device fluidly connected to the cylinder;

directly admitting exhaust into the prechamber via an exhaust feed opening fluidly connecting an uncooled exhaust conduit to the prechamber;

autoigniting the prechamber fuel to produce jets of gases from the prechamber ignition device; and igniting a main charge of a fuel in the cylinder via jets of gases produced via the autoignition of the prechamber fuel.

10. The method of claim 9 wherein the directly admitting a prechamber fuel includes directly injecting multiple shots of the prechamber fuel.

11. The method of claim 10 wherein at least one of the shots of the prechamber fuel is injected when a temperature in the prechamber is at least 900K.

12. The method of claim 10 wherein at least one of the multiple shots of the prechamber fuel is injected at a crank angle timing of the engine from about 180 degrees to about 160 degrees before a top dead center crank angle timing.

13. The method of claim 10 wherein a temperature in a prechamber of the prechamber ignition device upon the admitting of the prechamber fuel is at least 700K.

14. The method of claim 10 wherein the main fuel includes a methanol fuel or a diesel fuel, and the main fuel is direct injected or port injected.

15. An engine system comprising:

an engine having a cylinder formed therein, an intake port, an exhaust port, and a piston movable in the cylinder between a bottom-dead-center position and a top-dead-center position to increase a temperature and a pressure in the cylinder;

a fuel system including a fuel supply of a liquid fuel containing methanol;

an ignition system including a prechamber ignition device having a prechamber, a fuel port fluidly connected to the prechamber, an exhaust feed opening fluidly connected to the prechamber, and at least one ignition port fluidly connected to the cylinder; and the ignition system further including a fuel admission valve positioned fluidly between the fuel port and the fuel supply, and an exhaust admission valve positioned fluidly between the exhaust feed opening and the exhaust port.

16. The engine system of claim 15 further comprising a fuel injector having a spray outlet positioned within the cylinder or the intake port, and a fuel injection valve positioned fluidly between the spray outlet and the fuel supply.

17. The engine system of claim 15 further comprising an uncooled exhaust conduit extending between the exhaust port and the exhaust feed opening.

* * * * *